(No Model.)
E. P. LYNCH.
COMBINED LISTER PLOW AND PLANTER.
No. 418,526. Patented Dec. 31, 1889.
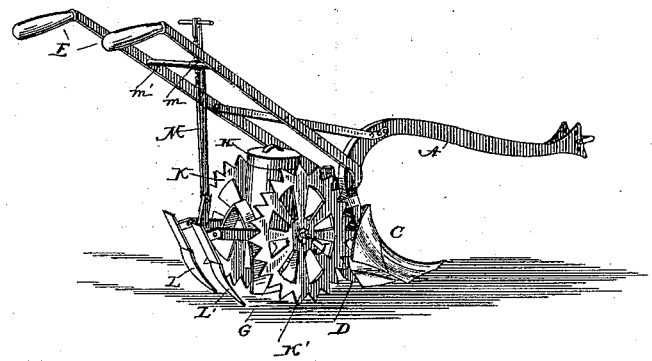
Fig. 1.
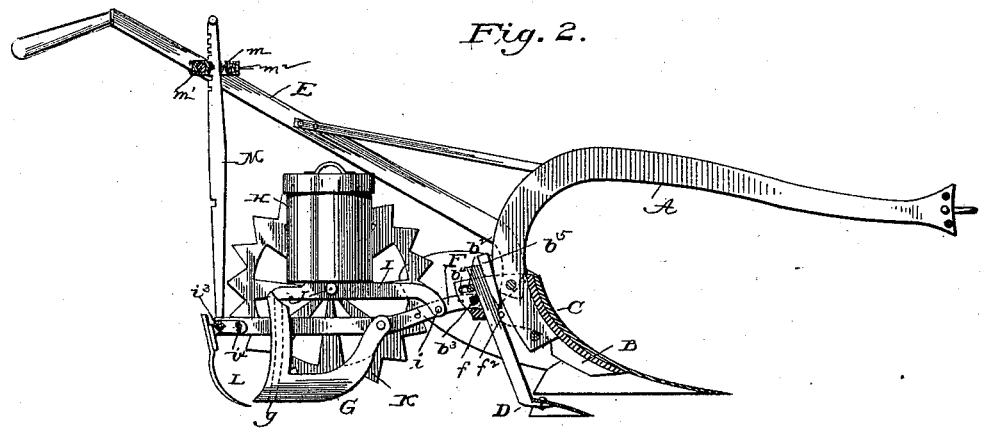
Fig. 2.
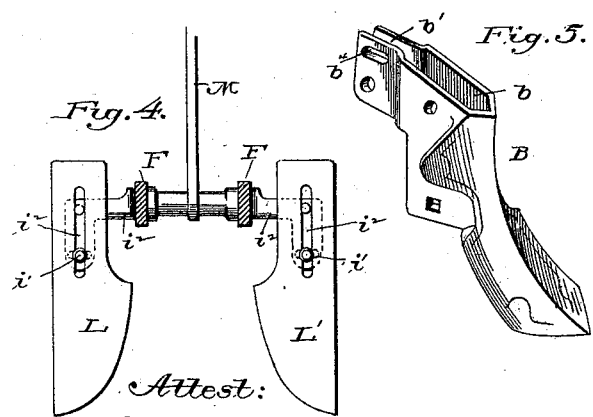
Fig. 4. Fig. 5. Fig. 3.
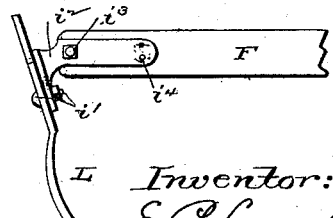
Attest:
W. M. Mortimer.
N. R. Kennedy.
Inventor:
E. P. Lynch
By P. T. Dodge
Atty.

UNITED STATES PATENT OFFICE.

EDWARD P. LYNCH, OF DAVENPORT, IOWA.

COMBINED LISTER PLOW AND PLANTER.

SPECIFICATION forming part of Letters Patent No. 418,526, dated December 31, 1889.

Application filed July 12, 1889. Serial No. 317,345. (No model.)

*To all whom it may concern:*

Be it known that I, EDWARD P. LYNCH, of Davenport, in the county of Scott and State of Iowa, have invented certain Improvements in Combined Lister Plows and Planters, of which the following is a specification.

This invention relates to that class of implements in which a furrow is formed by a double mold-board plow, a second furrow formed in its center by a subsoiling device, the seed delivered behind the subsoiler, and the seed finally covered by the scrapers; and the invention consists in various improvements having reference to the manner of constructing and uniting the various parts.

In the accompanying drawings, Figure 1 is a perspective view of my improved implement. Fig. 2 is a side elevation of the same with various parts in section. Fig. 3 is a side elevation showing one of the covering devices. Fig. 4 is a rear elevation showing the covering devices. Fig. 5 is a view of the frog.

Referring to the drawings, A represents the beam; B, the casting, commonly denominated the "frog," firmly secured to the lower end of the beam; C, a right and left mold-board, commonly known as a "double mold-board," bolted, together with the usual share, firmly to the front of the frog B; the subsoiling device having its standard firmly secured in the frog behind the beam, as hereinafter described; E E, the two divergent handles having their forward ends rigidly bolted to the sides of the frog B; F, the seeder-frame consisting of two bars arranged side by side at suitable distances apart and connected at their forward ends to the frog by a horizontal pivot $b^3$, that their rear ends may rise and fall with freedom.

G is an opener rigidly secured to the frame F in rear of the subsoiler for the purpose of opening a furrow for the seed. The opener is commonly constructed with a vertical seed-spout or passage $g$ in its rear end to conduct the seed from the distributing devices above to the furrow.

H is a seed box or hopper, provided at its base with seed-distributing mechanism of any suitable character adapted to operate by a horizontal shaft. This box is sustained upon a base plate or arm I, which is in turn connected at its forward end by a horizontal pivot $i$, preferably, to the gravitating frame F. Each is permitted a vertical motion independent of the other. The entire seeding mechanism is sustained and the feeding devices operated by a transverse shaft J, passing through the arms I and provided at its ends with one or two ground-wheels K K'.

L L' represent two shovels or co-operating devices attached to the side bars of the frame F in the rear of the runner for the purpose of turning the soil inward over the seed.

In order to insure the proper action of the runner and the covering devices, I prefer to lock them at fixed heights in relation to the subsoiler and mold-board. To this end I pivot to the rear end of the frame F an upright bar M, the upper end of which is notched and passed through a plate $m$, bolted to the cross-bar $m'$, which connects the plow-handles E E. The plate $m$ is adapted at the rear edge to enter the notch and hold the bar M, and is provided at the front with a spring $m^2$ to maintain the engagement. By shoving the bar forward it may be disengaged, so as to admit of its moving vertically to change the height of the runner and subsoiler.

It is to be observed that, although the opener and subsoiler are locked in position, the seed mechanism and its wheel are permitted a free vertical motion, so that the wheels are certain to travel at all times upon the bottom of the furrow, and thus insure the uniform delivery of the seed.

The frog B is cast complete in one piece, and serves as a support for and connection between the beam, the mold-board, the share, the handles, the subsoiler, and the rear frame. It is fashioned, as shown at Fig. 5, with its front face adapted to receive the mold-board and share, with a vertical socket $b$ to receive the end of the beam, with an open slot $b'$ at the rear to receive the standard or shank of the subsoiler, and with bearings $f f^2$ for the edges of the standard. The transverse bolt $b^2$ passes through the rear open edge of the frog, and serves to contract the same laterally upon the subsoiler-standard, holding it firmly in position to permit it to be adjusted vertically when they are released.

In order that the angle or inclination of the subsoiler may be changed at will, the slots $b^4$, through which the upper bolt $b^2$ passes, are elongated in a fore-and-aft direction, and a wedge $b^5$ inserted between the standard and the rear edge of the beam, as shown in Fig. 2. By raising the lower end of the wedge and by shifting the bolt $b^2$ in the slots, the upper end of the standard may be moved forward and backward and locked firmly in the desired position.

The covering-blades may be made of the form and attached to the frame F in the manner shown in Figs. 1, 3 and 5. In these figures each shovel is connected by a fore-and-aft pivot-bolt $i'$, passing through a horizontal slot in a casting $i^2$, so that the point of the shovel may be thrown to the right or left, as desired. The shovel is also slotted vertically to admit of its being raised and lowered upon the pivot-bolt. The casting $i^2$ is in turn connected to the beam by a transverse pivot $i^3$, and provided at the forward end with two or more holes $i^4$ to receive a break-pin or a fastening-bolt. This arrangement admits of the casting being changed in position on the beam to vary the pitch or forward inclination of the shovel. The covering devices may be otherwise formed and attached, if preferred.

Having thus described my invention, what I claim is—

1. In a combined lister and planter, the combination of the frog, with the mold-board, share, and subsoiler attached, the hinged frame F, having the opener and covering devices attached, the hinged gravitating frame I, provided with a seeding mechanism, and the frame-sustaining and seeder-operating shaft J, provided with one or more furrow-wheels.

2. The herein-described frog B, having the surface to receive the mold-board and share, and the vertical openings to receive the beam and the subsoiler-standard.

3. In combination with the beam, the frog embracing its end and sustaining the mold-board and share, the subsoiler-standard inserted through the rear side of the frog, and the transverse bolt contracting the frog to hold the standard.

4. In combination with the beam, the frog embracing its end and provided with the fore-and-aft slots, the subsoiler-standard passing through the frog in rear of the beam, the transverse adjustable bolt, and the wedge, whereby the subsoiler is held adjustably in position.

5. In combination with the beam, the mold-board and share, the subsoiler, and handles, the single casting or frog, to which all of said members are united and by which they are held in proper relations.

6. The mold-board plow provided with handles, in combination with a frame hinged thereto and provided with furrow opening and covering devices, a bar extending to the handles for vertically adjusting and locking said frame to regulate the depth of planting, a hinged gravitating frame or bar with a seed-distributer thereon, and a sustaining-shaft for the gravitating frame, provided at its ends with one or two wheels traveling at the sides of the furrow.

7. The beam, the frog inclosing its end, the mold-board and subsoiler secured to the frog, the frame F, hinged to the frog and provided with the opener, the seeder-carrying frame I, hinged to frame F, and the shaft and sustaining-wheels applied to frame I, said elements combined substantially as described and shown.

In testimony whereof I have hereunto set my hand, this 6th day of June, 1889, in the presence of two attesting witnesses.

EDWARD P. LYNCH.

Witnesses:
  J. BARKER,
  F. M. DECKER.